Sept. 10, 1963 T. B. FRAME ETAL 3,103,194
METHOD OF MAKING WHEEL TRIM OR COVERS
Filed May 5, 1960 4 Sheets-Sheet 1
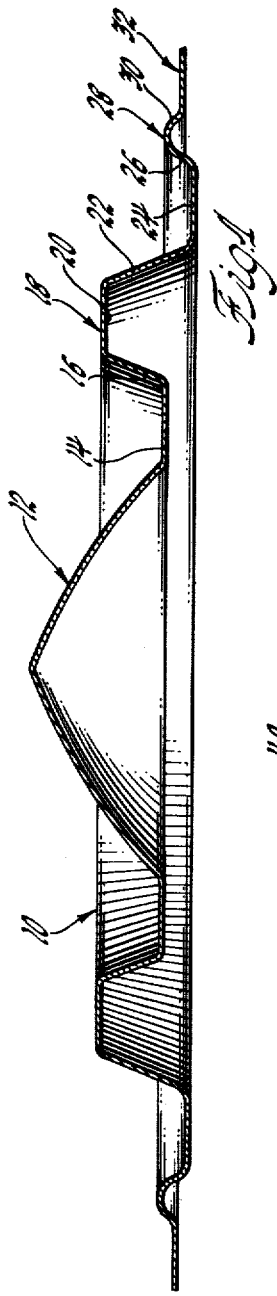
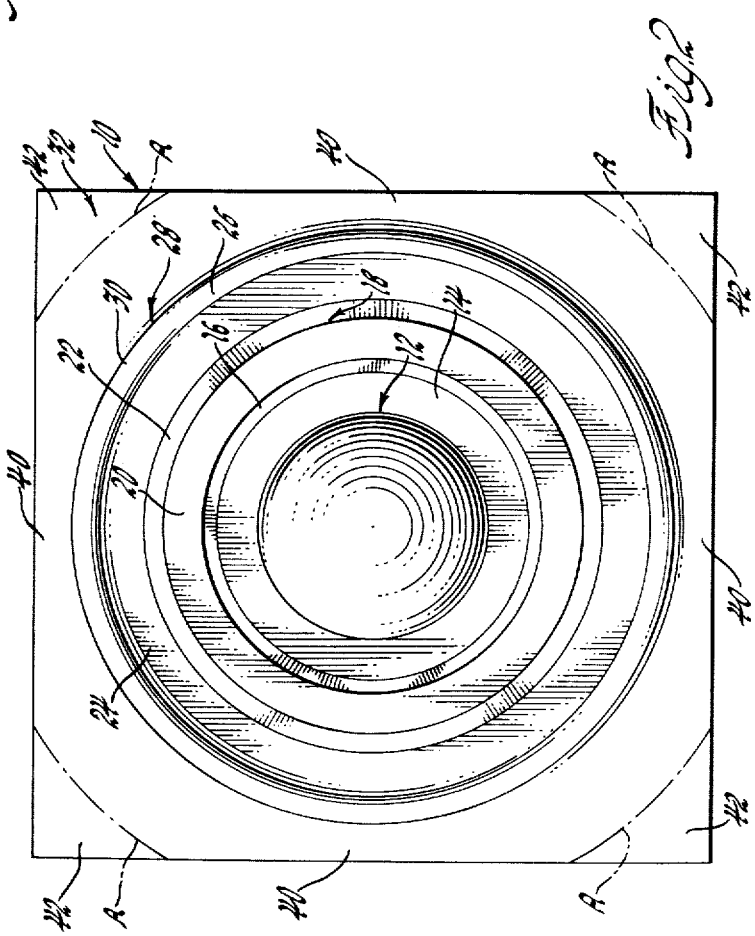
INVENTORS
Thomas B. Frame &
BY Arnold J. Maletzke
Herbert Furman
ATTORNEY

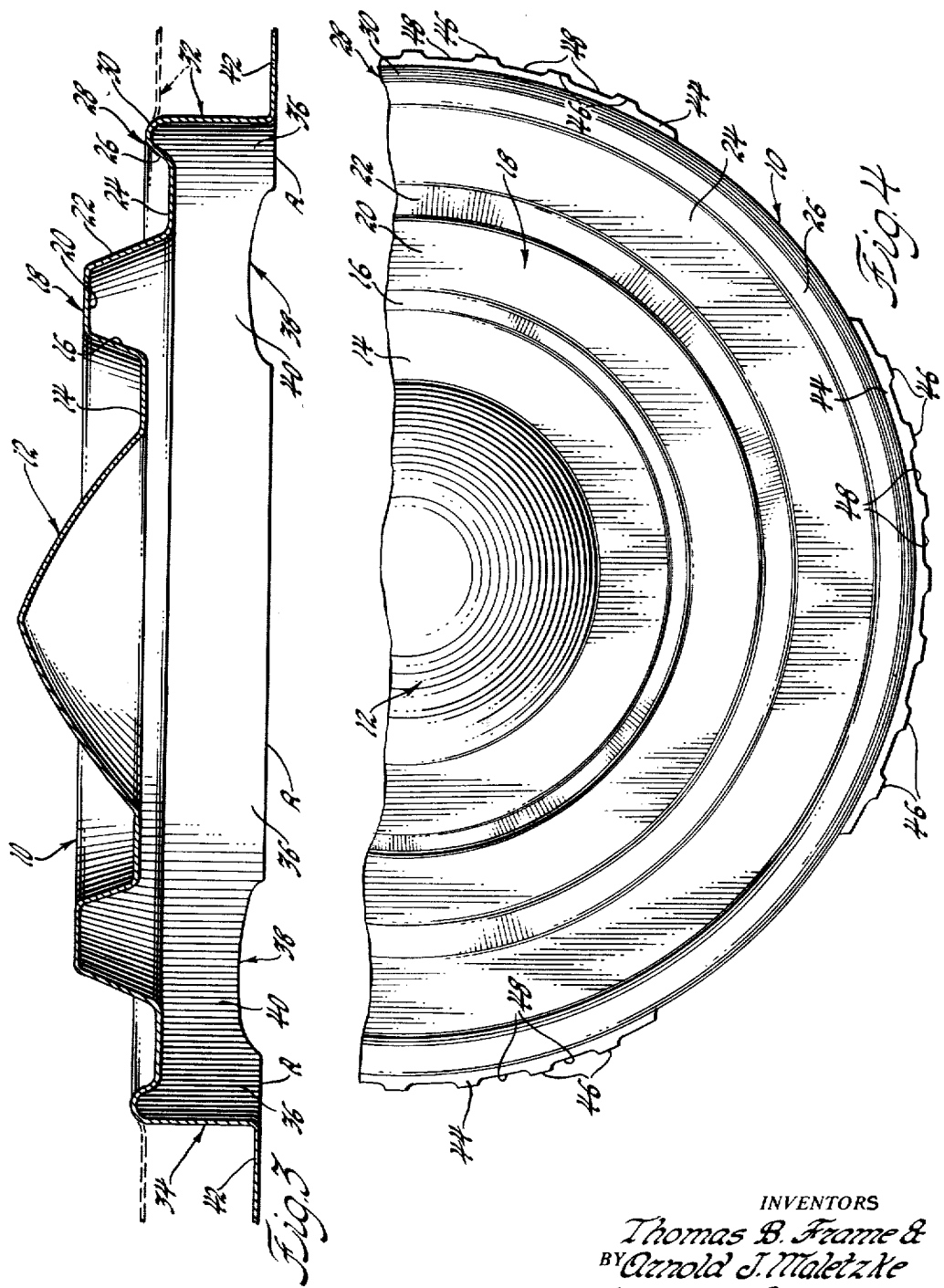

Sept. 10, 1963 T. B. FRAME ETAL 3,103,194
METHOD OF MAKING WHEEL TRIM OR COVERS
Filed May 5, 1960 4 Sheets-Sheet 3
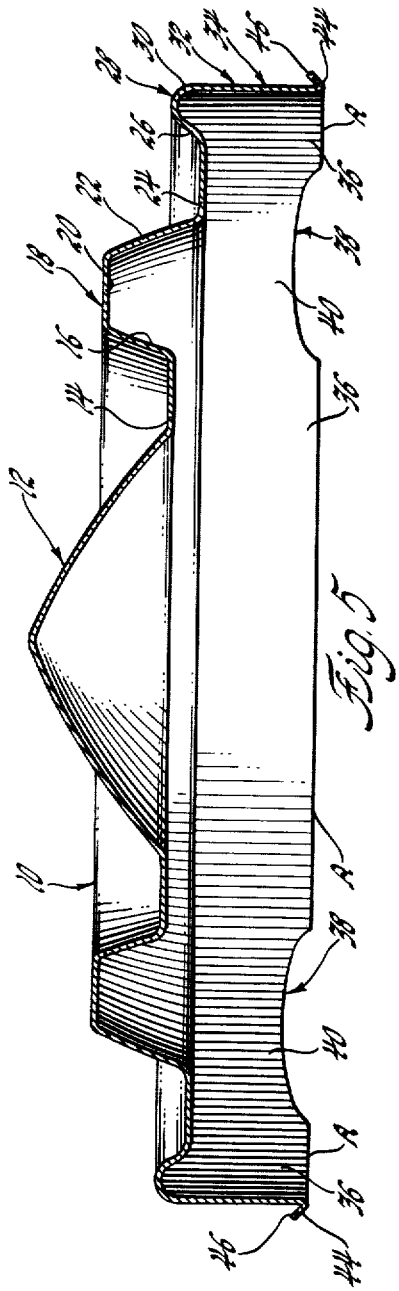
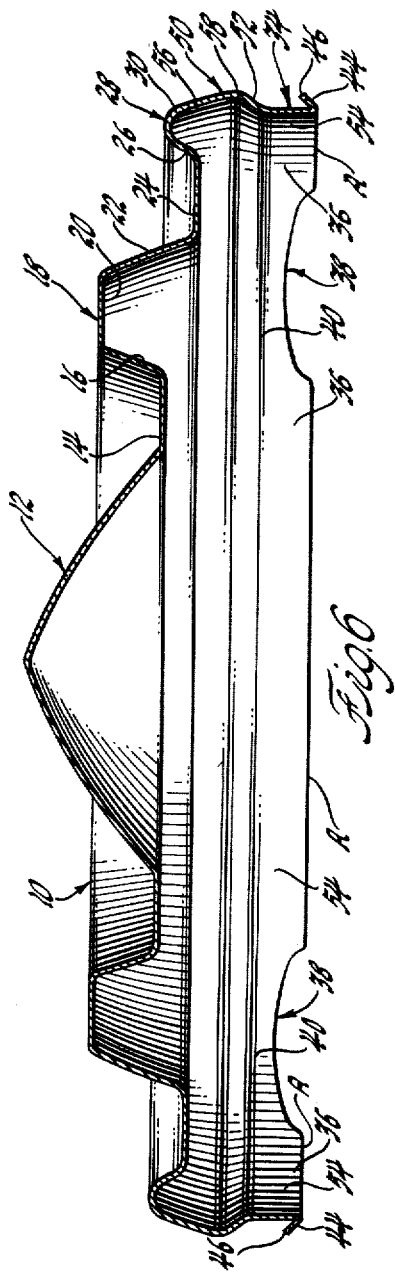
INVENTORS
Thomas B. Frame &
BY Arnold J. Maletzke
Herbert Furman
ATTORNEY Sept. 10, 1963    T. B. FRAME ETAL    3,103,194
METHOD OF MAKING WHEEL TRIM OR COVERS
Filed May 5, 1960    4 Sheets-Sheet 4
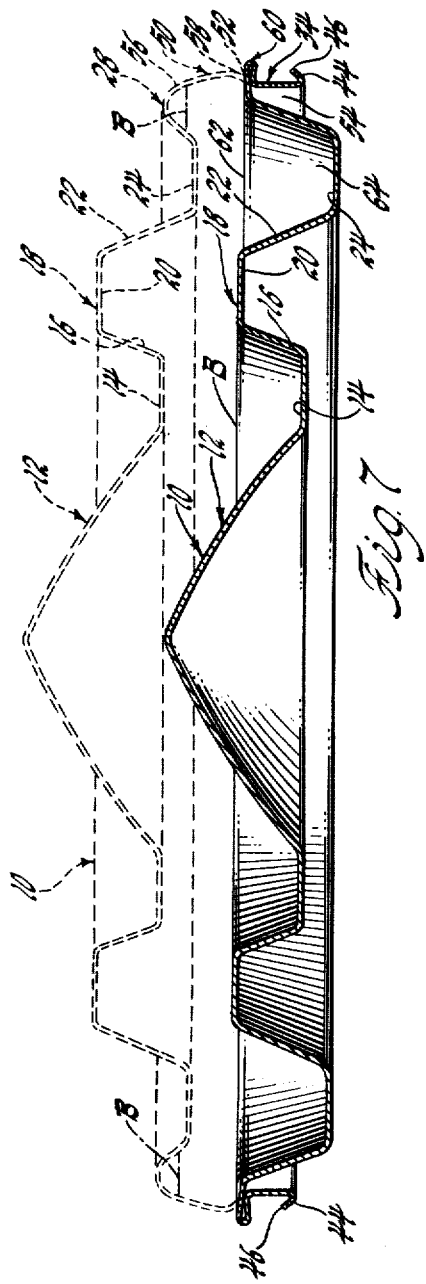
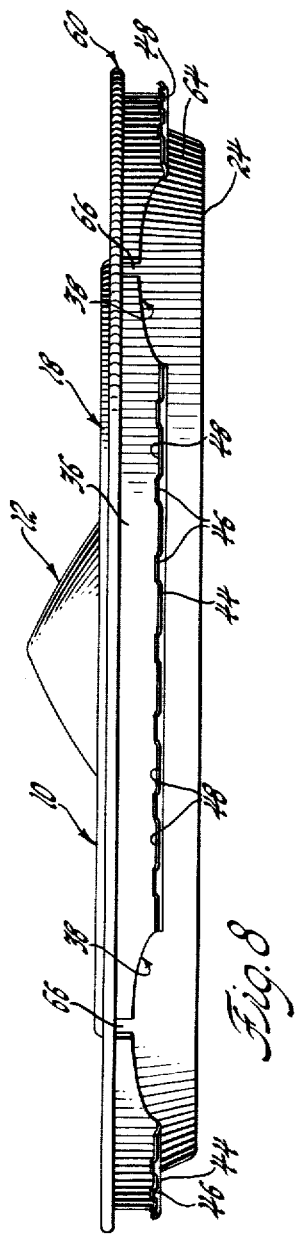
INVENTORS
Thomas B. Frame &
BY Arnold J. Maletzke
Herbert Freeman
ATTORNEY

United States Patent Office 3,103,194
Patented Sept. 10, 1963

3,103,194
METHOD OF MAKING WHEEL TRIM
OR COVERS
Thomas B. Frame, Syracuse, and Arnold J. Maletzke, Fayetteville, N.Y., assignors to General Motors Corporation, Detroit, Mich., a corporation of Delaware
Filed May 5, 1960, Ser. No. 27,107
4 Claims. (Cl. 113—51)

This invention relates to wheel covers and more particularly to a new and improved method of making wheel trim or covers adapted to be mounted on the outer sides of vehicle wheels.

The primary object of this invention is to provide a new and improved method of manufacturing wheel trim or covers. Another object of this invention is to provide a new and improved method of manufacturing wheel trim or covers from a minimum blank size. A further object of this invention is to provide a new and improved method of manufacturing wheel trim or wheel covers which include a marginal folded flange having extending axially inwardly therefrom wheel cover retaining means adapted to self-retainingly engage a portion of a vehicle wheel. Yet another object of this invention is to provide a new and improved method of manufacturing wheel trim or covers from a minimum blank size and provide the wheel trim or cover with a retaining flange structure of sufficient extent so as to self-retainingly mount the wheel trim or cover on a vehicle wheel. Yet a further object of this invention is to provide a new and improved method of manufacturing wheel trim or covers from a minimum blank size and provide the wheel trim or cover with a marginal folded flange having extending axially inwardly therefrom a retaining flange structure adapted to self-retainingly engage a portion of a vehicle wheel so as to removably mount the wheel trim or cover thereon.

These and other objects of this invention will be readily apparent from the following specification and drawings, wherein:

FIGURE 1 is a sectional view of the blank after an initial drawing step in the method of manufacture of this invention;

FIGURE 2 is a plan view of the blank shown in section in FIGURE 1;

FIGURE 3 is a sectional view of the blank after the next successive step;

FIGURE 4 is a partial plan view of the blank after the succeeding step;

FIGURE 5 is a sectional view of the blank after the next successive step;

FIGURE 6 is a sectional view of the blank after the succeeding step;

FIGURE 7 is a sectional view of the blank after the next successive step; and

FIGURE 8 is a side elevational view of a wheel cover manufactured according to the method of this invention.

Before proceeding with a detailed description of the method of manufacture of this invention, a general description of the subject method will be helpful. Generally, the sheet metal stock used in manufacturing wheel trim or covers is received in coil form and is then unwound and fed to a press capable of performing the initial blank and draw step of the subject method. In certain instances it may be necessary or desirable to first blank the coil stock prior to any drawing operation, but in most instances the blanking operation can be combined with the initial draw step. In the initial step, the blank, preferably of polygonal shape, such as square, hexagon, or octagon, is drawn so as to provide the blank with the central cover shape and also with a shallow outer annular axially inwardly opening rib, the outer wall of the rib merging into a radially directed flat annular marginal flange lying generally in the plane of the initial blank prior to any drawing operation. Thereafter, a restrike step may be used to sharpen up the central cover shape and to complete all of the ribs, grooves, and other embellishment of the central cover shape inwardly of the outer annular rib.

In the succeeding step, the radially directed marginal flange is turned axially inwardly into an extension of the outer wall of the annular rib to provide the blank with a continuous annular axially directed radially facing marginal flange. This flange will be of varying axial depth, including a number of flange extensions corresponding to and provided by the corners of the blank and being separated by an equal number of arcuate cutouts defined by the material of the blank intermediate the corners thereof. Preferably, a square shaped blank is used, but other polygonally shaped blanks, such as a hexagon or octagon, may be used with equal success.

In the successive step, or combined with the preceding step, the axially inner portions of the flange extensions are turned radially outwardly of the annular marginal flange to provide circumferentially extending radially directed finger flange extensions therefrom. Thereafter, in the next successive step or combined with the preceding step, the finger flange extensions are blanked to provide fingers. In the succeeding step, the finger flange extensions are turned axially outwardly of the annular marginal flange and are shaped so as to be circumferentially arcuate to provide the self-retaining means for the wheel trim or cover. It should also be noted, of course, that other types of self-retaining means may be used, such as beads, etc., and in such instances, other operations or steps on the flange extensions may be necessary in order to provide the particular self-retaining means selected.

In the successive step, the axially outer portion of the annular marginal flange is bulged radially outwardly to provide a radially outwardly directed rib having axially inner and axially outer disposed walls which merge at the peak of the rib. The axially outer wall of the bulged rib merges with the peak of the axially inwardly opening annular rib provided in the initial blank and draw step, and the axially inner wall of the bulged rib merges with the axially inner portion of the annular marginal flange which is maintained in location. Thereafter, in the succeeding step, the radially outwardly directed rib is collapsed across the peak thereof from the juncture of the axially inner wall of the rib with the axially inner portion of the annular marginal flange to a preselected annular line on the axially outer wall thereof to provide a marginal radially outwardly directed folded flange. The preselected annular line will vary with the style of the wheel trim or cover, since the selection of this line determines the radial depth of the axially outer wall of the marginal folded flange. In the successive step or combined with the preceding step, the entire central portion of the cover, including the axially outer portion of the axially outer wall of the bulged rib, is displaced axially inwardly from the preselected annular line across a juncture rib with the axially outer wall of the marginal folded flange, with the peak of the axially inwardly opening rib and the axially outer portion of the axially outer wall of the bulged rib being shaped into a continuation of the radially axially inner wall of the inwardly opening rib to provide a radially inwardly facing and axially inwardly extending annular cover wall or flange joining the marginal folded flange with the central portion of the cover.

Certain succeeding steps may be necessary to provide the cover with a valve stem aperture and with certain other features, such as an anti-turn feature. In the specific cover shown and described herein, the axially inner portion of the annular marginal flange is notched centrally of each of the arcuate cutouts to juncture of this portion with the lower wall of the folded flange. This step can be accomplished either prior to the bulging of the annular marginal flange, after the marginal flange is bulged, or after the bulged rib is collapsed.

The method of this invention is intended to use a minimum number of steps required to completely manufacture the wheel trim or cover, and accordingly certain steps may be combined, modified, or deleted depending on the central cover shape and self-retaining means of the particular cover.

Referring now particularly to FIGURES 1 and 2 of the drawings, the initial blank and draw step will be described. The stock is initially blanked to provide a blank 10 of square shape which is drawn to provide the central cover shape including a cone portion 12 merging into a radially extending, axially facing annular cover wall or flange 14 which merges into an annular axially outwardly extending and radially inwardly facing inner wall or flange 16 of an axially inwardly opening annular rib 18. The radially extending axially outwardly facing annular wall or flange 20 of the rib merges into the axially outwardly extending radially outwardly facing outer wall 22 of the rib. Wall 22 merges with an axially outwardly facing and radially extending annular wall or flange 24, which in turn merges with the radially inner wall 26 of an annular axially inwardly opening rib 28. The radially outer wall 30 of the rib 28 merges with a flat annular radially directed marginal flange 32 which lies generally in the initial plane of the blank 10 prior to any drawing operation. Rib 28 is a draw rib and is provided in the blank 10 by the die structure so as to maintain initial length and width of the blank while the inner or central portion of the blank is being stretched and cold worked to provide the central cover shape including the cone portion 12 and the rib 18. Accordingly, rib 28 is required by the die structure in order that the inner or central portion of the blank may be die formed without distorting the size of the blank.

Referring now particularly to FIGURE 3 of the drawings, in the next step, the flange 32 is turned axially inwardly from its full line position of FIGURES 1 and 2 and its dash portion of FIGURE 3 into an extension of the outer wall 30 of rib 28 so as to provide the blank with a continuous annular axially directed radially facing marginal flange 34. Flange 34 is of varying axial depth and includes four flange extensions 36 provided by the corners of the blank and being separated by four arcuate cutouts 38 which are defined by the portions 40 of blank 10 intermediate the corners thereof, FIGURE 2. At the same time that the flange 32 is turned axially inwardly, or in a separate step, portions 42 of the flange extensions are turned radially outwardly of the flange 34 about annular lines A, FIGURES 2 and 3, to provide finger flange extensions. Thereafter, in the succeeding step as shown in FIGURE 4, the finger flange extensions 42 are blanked to provide finger retaining means for the cover. The finger means generally include a radially directed partial circumferential flange 44 of short radial depth having extending therefrom a plurality of fingers 46, with the circumferential extent of the fingers 46 being approximately one-half of the circumferential extent of the cutouts 48 intermediate the fingers, and the radial extent of the fingers being approximately twice the radial extent of the flange 44. In the specific method of manufacture described herein, four such groups of fingers 46 will be provided on the cover since a square shaped blank was used. If a hexagonally shaped blank were used, six such groups of fingers would be provided, and likewise, if an octagonally shaped blank were used, eight such groups of fingers would be provided.

In the next succeeding step, as shown in FIGURE 5, the flanges 44 and fingers 46 are turned axially outwardly relative to the flange 34 so that the finger retaining means project generally axially and radially outwardly with respect to the flange 34 and are also circumferentially arcuate.

In the succeeding step, as shown in FIGURE 6, the axially outer portion of the annular marginal flange 34 is bulged radially outwardly to provide a radially outwardly directed rib 50, the axially inner wall 52 of the rib merging on an arcuate juncture with the axially inner portion 54 of flange 34, and the axially outer wall 56 of the rib merging with the peak area of the rib 28. The axially inner portion 54 of flange 34 is maintained in situ during the bulging operation as can be seen from a comparison of FIGURES 5 and 6.

In the next succeeding step, as shown in full and dotted lines in FIGURE 7, the rib 50 is collapsed across the peak 58 thereof to provide a marginal radially outwardly directed folded flange 60. When the rib 50 is collapsed, the axially inner wall 52 of the rib is turned generally radially outwardly with respect to the axially inner portion 54 of flange 34 and the axially outer wall 56 of the rib is turned generally radially inwardly of the wall 52 from the peak 58 of the rib 50. Preferably, simultaneously with the collapsing of the rib 50, or in a separate step thereafter, the axially outer portion of the axially outer wall 56 of the rib 50 is turned axially inwardly of the axially inner portion of this wall across a predetermined annular line generally indicated as B to provide a juncture rib 62 interconnecting the axially outer and axially inner portions of the axially outer wall 56. Simultaneously with the turning of the axially outer portion of the wall 56 across the predetermined annular line B, the entire inner or central portion of the cover, including the cone portion 12 and rib 18, is displaced axially inwardly of the folded flange 60 and the peak area of rib 28 and the axially outer portion of wall 56 are shaped into a continuation of wall 26 so as to provide an axially outwardly facing wall or flange 64 which extends from the wall 24 to the annular juncture rib 62 which includes the predetermined annular line B on the wall 56. Thus, the entire inner or central portion of the cover including the peak area of rib 28 and the axially outer portion of wall 56 is displaced axially inwardly from the predetermined annular line B and the rib 28 is destroyed to complete the shaping of the cover and to locate the radially directed marginal folded flange 60 with respect to the inner or central portion of the cover.

There are certain other steps or operations which must be performed prior to completion of the manufacture of the cover. These steps include the addition of the valve stem aperture, the addition, if required, of an antiturn feature. As can be seen in FIGURE 8, the axially inner portion 54 of the flange 34 is notched at 66 centrally of each of the arcuate cutouts 38, from the edge of the cutout to the juncture of the axially inner portion 54 with the wall 52 of the rib 50. These notches ensure that the four equally spaced portions 54 of the flange extensions 36 flex independently of each other when the fingers 46 grippingly engage a retaining surface of a vehicle wheel. This notching step can be performed prior to the bulging of the marginal flange 34, after the bulging of the flange 34 or after the rib 50 provided by the bulging of the flange 34 has been collapsed.

Although the method of manufacture has been described in conjunction with a wheel cover, it will be understood, of course, that it may be applied with equal success to a wheel trim which may or may not include any central cone portion 12 or other portions of the subject cover. It will also be understod, of course, that other types of self-retaining means may be provided, such as different forms or shapes of teeth 46 or the use of beads, etc. In instances such as these, the steps shown and described in conjunction with FIGURES 3, 4, and 5, may be varied or dispensed with to suit the particular retaining means selected.

Thus, this invention provides a new and improved method of manufacturing wheel trim or covers.

What is claimed is:

1. A method of making a wheel cover comprising, drawing a polygonally shaped sheet metal blank to provide an annular body having a continuous radially outwardly directed marginal flange merging into the radially outer wall of an axially directed rib inset from the periphery of said blank and having an axially extending inner wall joined to said annular body, turning said flange radaily into an axially directed extension of said outer wall of said rib to provide an annular axially directed flange, radially bulging the axially outer portion of said annular flange adjacent the peak of said rib to provide a radially directed rib while maintaining the location of the axially inner portion of said axially directed rib and said annular flange, said radial rib having axially inner and outer walls merging across the peak of said radial rib, radially outwardly folding the axially inner wall of said radial rib from juncture of said wall with said inner flange portion to the peak of said rib while simultaneously radially inwardly folding one portion of the axially outer wall of said radial rib from the peak of said rib to a pre-selected annular line on said axially outer wall to thereby collapse said radial rib across the peak thereof and provide a marginal radially outwardly directed folded flange, and destroying said axially directed rib by axially displacing said axially directed rib and the other portion of the axially outer wall of said radial rib from said pre-selected annular line into a continuation of said axially extending inner wall of said axial rib to displace said annular body axially and provide an axially directed flange joining said annular body to said folded flange across a juncture rib.

2. A method of making a wheel cover comprising, drawing a polygonally shaped flat sheet metal blank to provide an annular body having an annular axially directed radially outermost peripheral marginal flange joined thereto by an annular axially directed rib, radially bulging the axially outer portion of said flange adjacent said axial rib to provide a radially outwardly directed rib having axially inner and outer walls merging at the peak of said radial rib while maintaining the location of said axial rib and the axially inner portion of said flange, collapsing said radial rib across the peak thereof from the juncture of the axially inner wall of the rib with the axially inner portion of said flange to a preselected annular line on the axially outer wall thereof to provide a radially outwardly directed peripheral folded flange formed from the material of said axially inner wall and the portion of the material of said axially outer wall from the peak of said radial rib to said preselected annular line, and destroying said axial rib by displacing said axial rib and the remainder of the material of the axially outer wall of said radial rib axially inwardly from said preselected annular line to displace said annular body axially inwardly and provide an axially inwardly directed flange joining said annular body to said radial folded flange across a juncture rib.

3. A method of making a wheel cover comprising, drawing a polygonally shaped flat sheet metal blank to provide an annular body having an annular axially directed radially outermost peripheral marginal flange joined thereto by an annular axially directed rib, said flange including flange extensions provided by the corners of said blank and being separated by arcuately shaped cutout portions defined by the material of said blank intermediate the corners thereof, radially bulging the axially outer portion of said flange adjacent said axial rib to provide a radially outwardly directed rib having axially inner and outer walls merging at the peak of said radial rib while maintaining the location of said axial rib and the axially inner portion of said flange, collapsing said radial rib across the peak thereof from the juncture of the axially inner wall of the rib with the axially inner portion of said flange to a preselected annular line on the axially outer wall thereof to provide a radially outwardly directed peripheral folded flange formed form the material of said axially inner wall and the portion of the material of said axially outer wall from the peak of said radial rib to said preselected annular line, destroying said axial rib by displacing said axial rib and the remainder of the material of the axially outer wall of said radial rib axially inwardly from said preselected annular line to displace said annular body axially inwardly and provide an axially inwardly directed flange joining said annular body to said radial folded flange across a juncture rib, and forming cover retaining means on said flange extensions intermediate said arcuately shaped cutout portions.

4. A method of making a wheel cover comprising, drawing a polygonally shaped flat sheet metal blank to provide an annular body having an annular axially directed radially outermost peripheral marginal flange joined therto by an annular axially directed rib, said flange including flange extensions provided by the corners of said blank and being separated by arcuately shaped cutout portions defined by the material of said blank intermediate the corners thereof, radially bulging the axially outer portion of said flange adjacent said axial rib to provide a radially outwardly directed rib having axially inner and outer walls merging at the peak of said radial rib while maintaining the location of said axial rib and the axially inner portion of said flange, collapsing said radial rib across the peak thereof from the juncture of the axially inner wall of the rib with the axially inner portion of said flange to a preselected annular line on the axially outer wall thereof to provide a radially outwardly directed peripheral folded flange formed from the material of said axially inner wall and the portion of the material of said axially outer wall from the peak of said radial rib to said preselected annular line, destroying said axial rib by displacing said axial rib and the remainder of the material of the axially outer wall of said radial rib axially inwardly from said preselected annular line to displace said annular body axially inwardly and provide an axially inwardly directed flange joining said annular body to said radial folded flange across a juncture rib, forming cover retaining means on said flange extensions intermediate said arcuately shaped cutout portions, and notching said flange at said arcuate cutout portions to the juncture of said flange with the axially inner wall of said folded flange.

References Cited in the file of this patent

UNITED STATES PATENTS

| | | |
|---|---|---|
| 2,707,449 | Lyon | May 3, 1955 |
| 2,929,345 | Zatyko | Mar. 22, 1960 |
| 2,973,736 | Lyon | Mar. 7, 1961 |

FOREIGN PATENTS

| | | |
|---|---|---|
| 564,839 | Canada | Oct. 21, 1958 |

UNITED STATES PATENT OFFICE
CERTIFICATE OF CORRECTION

Patent No. 3,103,194                        September 10, 1963

Thomas B. Frame et al.

It is hereby certified that error appears in the above numbered patent requiring correction and that the said Letters Patent should read as corrected below.

Column 3, line 31, after "maintain" insert -- the --; column 5, lines 14 and 15, strike out "said axially directed rib and" and insert the same after "of", first occurrence, in line 14, same column 5.

Signed and sealed this 25th day of February 1964.

(SEAL)
Attest:
ERNEST W. SWIDER                      EDWIN L. REYNOLDS

Attesting Officer                    Acting Commissioner of Patents